(12) United States Patent
Greshishchev et al.

(10) Patent No.: US 8,761,614 B2
(45) Date of Patent: Jun. 24, 2014

(54) PARALLEL CONVERSION BETWEEN OPTICAL AND DIGITAL

(75) Inventors: Yuriy Greshishchev, Kanata (CA); Ian Betty, Ottawa (CA); Kim B. Roberts, Nepean (CA)

(73) Assignee: Ciena Corporation, Hanover, MD (US)

( * ) Notice: Subject to any disclaimer, the term of this patent is extended or adjusted under 35 U.S.C. 154(b) by 238 days.

(21) Appl. No.: 13/159,871

(22) Filed: Jun. 14, 2011

(65) Prior Publication Data

US 2012/0321325 A1  Dec. 20, 2012

(51) Int. Cl.
*H04B 10/06* (2006.01)
(52) U.S. Cl.
USPC .......................................... 398/204; 398/208
(58) Field of Classification Search
USPC .......................................... 398/202–204, 208
See application file for complete search history.

(56) References Cited

U.S. PATENT DOCUMENTS

| | | | | |
|---|---|---|---|---|
| 5,416,628 | A * | 5/1995 | Betti et al. .................... | 398/185 |
| 7,701,842 | B2 | 4/2010 | Roberts et al. | |
| 8,103,166 | B2 * | 1/2012 | Liu ................................ | 398/65 |
| 8,218,979 | B2 * | 7/2012 | Liu ................................ | 398/208 |
| 8,280,245 | B2 * | 10/2012 | Westlund et al. .............. | 398/16 |
| 8,437,638 | B2 * | 5/2013 | Kobayashi et al. ............ | 398/90 |
| 2007/0297806 | A1 * | 12/2007 | Kaneda et al. ................ | 398/152 |
| 2010/0310256 | A1 | 12/2010 | Shpantzer et al. | |
| 2011/0142457 | A1 | 6/2011 | Betty et al. | |
| 2012/0076507 | A1 * | 3/2012 | Roberts et al. ................ | 398/205 |

OTHER PUBLICATIONS

J.K. Fischer, et al., "Digital Coherent Receiver Based on Parallel Optical Sampling" ECOC 2010, Sep. 19-23, 2010, Torino-Italy, IEEE, pp. 1-3.
Chao Zhang, et al., Demodulation of 1.28-Tbit/s Polarization-multiplexed 16-QAM Signals on a Single Carrier with Digital Coherent Receiver, OTuG3, 2009 OSA/OFC/NFOEC, 2009, IEEE, pp. 1-3.

* cited by examiner

*Primary Examiner* — Dalzid Singh
(74) *Attorney, Agent, or Firm* — Kent Daniels; Daniels IP Services Ltd.

(57) ABSTRACT

A coherent optical receiver Includes an electro-optic module coupled to an electronic signal processing Integrated circuit (IC) via a parallel analog transmission line bus. The electro-optic module receives and detects an optical channel light including a high-bandwidth signal modulated thereon. The electro-optic module includes: a single optical hybrid for mixing the optical channel light with a corresponding continuous wave local oscillator light to generate a mixed light containing the high-bandwidth data signal, at least one photodetector; and an analog frequency decimator for generating a set of parallel analog signals, each analog signal representing a respective portion of the high-bandwidth signal. The electronic signal processing IC includes a respective Analog-to-digital (A/D) converter for sampling each one of the set of parallel analog signals, and for generating corresponding parallel digital sample streams; and a digital signal processor (DSP) for processing the parallel digital sample streams to extract the high-bandwidth signal.

21 Claims, 8 Drawing Sheets

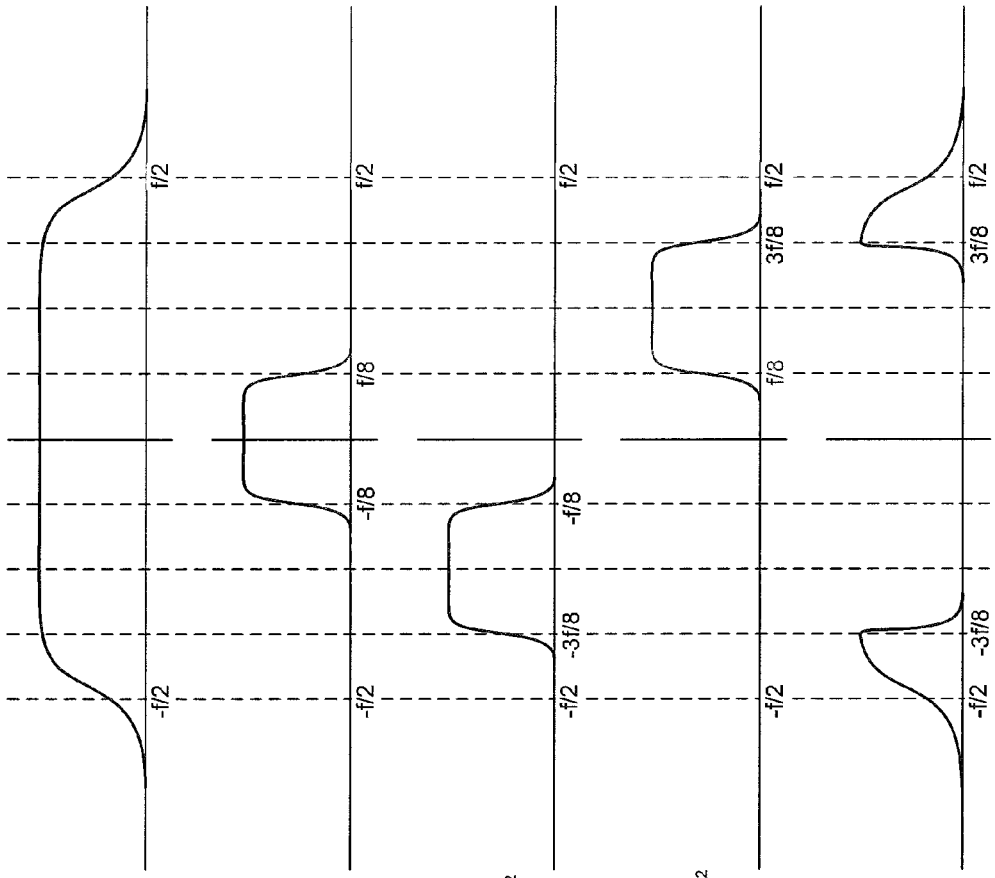

PARALLEL CONVERSION BETWEEN OPTICAL AND DIGITAL

CROSS-REFERENCE TO RELATED APPLICATIONS

This application is the first application for patent filed in respect of the present invention.

MICROFICHE APPENDIX

Not Applicable.

TECHNICAL FIELD

The present invention relates to optical communications networks, and in particular to parallel conversion between optical and digital signals in a coherent optical receiver.

BACKGROUND

FIGS. 1A and 1B respectively illustrate optical transmit and receive modules of a type typically used in coherent optical transmission systems. Referring to FIG. 1A, a transmit module 2 typically comprises a connector 4, digital driver 6, analog driver 8, and an optical modulator 10, all of which are mounted on a printed circuit board (PCB) substrate 12. The connector 4 is typically a multi-pin connector which enables digital data signals to be supplied to the module 2 for transmission, as well as electrical power supply and ground connections for the digital and analog drivers. The digital driver 6 is typically provided as a digital signal processor (DSP), for computing digital driver signals based on the received digital data signals. For example, the digital driver 6 may process the received digital data signals to implement an encoding scheme such as Phase Shift Keying (PSK), so that the digital drive signals will take the form of encoded symbols. More complex signal processing functions may be implemented as desired. The analog driver 8 comprises digital-to-analog converters (DACs) and analog signal conditioning circuits (such as power amplifiers, and filters) for converting the digital diver signals into analog driver signals that are suitable for driving the modulator 10. The modulator 10, which may, for example, be a Mach-Zehnder modulator) receives narrow-band optical carrier light from a laser 14, and outputs a modulated optical channel signal based on the analog driver signals. In the illustrated embodiment, the laser 14 is located remotely from the transmit module 2, and the narrow-band optical carrier is supplied to the modulator 10 via an input optical fibre "pig-tail" 16. The modulated optical channel signal output by the modulator 10 is directed to downstream optical devices (such as optical multiplexers etc., not shown) via an output optical fibre pig-tail 18.

Referring to FIG. 1B, a receiver module 20 typically comprises an optical hybrid 22, photodetector block 24, analog receiver stage (A-Rx) 26, digital signal processor (DSP) 28, and a connector 30, all of which are mounted on a PCB substrate 32. The optical hybrid 22 receives an input optical channel signal through an optical fibre pig-tail 34 connected to upstream optical devices (such as an optical de-multiplexer, not shown) and narrow-band light from a local oscillator 36 via a respective LO pig-tail 38. The photodetector block 24 receives mixed light from the optical hybrid, and outputs corresponding analog electrical signals. The analog receiver stage 26 comprises analog signal conditioning circuits (such as power amplifiers, filters etc.) and analog-to-digital (A/D) converters (not shown) for converting the analog electrical signals from the photodetectors into raw digital sample streams which are processed by the DSP 28 to detect and recover digital data signals modulated on the received optical channel signal. The connector 30 is typically a multi-pin connector which enables recovered digital data signals output from the DSP 28 to be supplied to further data recovery and processing systems, as well as electrical power supply and ground connections for the photodetector array 24, analog receiver stage 26, and the DSP 28.

In both of the transmit and receive modules described above, the PCB substrate 12, 32 provides both a structural support for each of the other elements of the module, and the electrical interconnections between them. In the case of the transmit module (FIG. 1a), a digital data bus 40 is provided between the connector 4 and the digital driver 6, which is designed to carry data signal traffic at the intended bit-rate; a high-speed digital interface 42 is provided between the digital driver 6 and the analog driver 8, for conveying encoded digital signals at a desired sample rate. Finally, an analog transmission line bus 44 is provided for carrying the (typically radio frequency) analog drive signals from the analog driver 8 to the modulator 10. In the case of the receive module 20 (FIG. 1b), the optical hybrid 22 and photodetector block 24 are optically connected via optical waveguides 46 which are often supported independently of the PCB substrate 32. An analog transmission line bus 48 is provided for carrying the (typically radio frequency) analog signals from the photodetector block 24 to the analog receiver stage 26. A high-speed digital interface 50 is provided between the analog receiver stage 26 and the DSP 28, for conveying the raw digital sample stream at the A/D convertor sample rate. Finally, a digital data bus 52 is provided between the DSP 28 and the connector 30, which is designed to carry recovered digital data signals at the intended bit-rate.

Typically, the various active components of the transmit and receive modules are provided as separate Integrated Circuit (IC) devices, which are assembled together on the PCB substrate 12, 32, for example using known surface mounting techniques. This arrangement enables each of these components to be separately manufactured (e.g. by different manufacturers) which increases the design freedom in selecting components for each module, and reduces costs. However, this arrangement suffers a disadvantage in that each of the digital and analog buses 40-44 and 48-52 are relatively long, and the impedance of theses electrical interconnections means that each of the active components (principally the digital and analog drivers on the transmit module 2, and the analog receiver stage and the DSP on the receiver module 20) must have suitable impedance-matching and power-driver circuits in order to drive the buses 40-44 and 48-52 and so transmit the required signals. This increases both the cost and power consumption of each of these devices, as well as presenting an additional source of noise. The severity of these problems tends to increase rapidly with increases in either data signal bit rates and complexity of the digital signal processing implemented by the digital driver and DSP components.

For appropriate impedance control at high bandwidths, expensive waveguides and connectors may be required.

Co-pending U.S. patent application Ser. No. 12/721,876 filed Mar. 19, 2010 and entitled Integrated Transmit and Receive Modules, teaches techniques for of addressing this problem, by combining the optical and electronic components into respective Integrated Circuit (IC) elements, which are then connected together (both electrically and mechanically, via solder balls or bumps. Thus, for example, in the case of a receiver, an electro-optical IC includes the optical hybrid 22 and the photodetector block 24, while the analog receiver stage 26 and the DSP 28 are fabricated together in an electronic signal processing IC. The electronic signal processing IC is then connected to a package base (also using solder bumps, for example) which provides an integral pin-connector. A transmitter may be constructed in a similar manner, in which the digital and analog driver stages 6 and 8 are combined in a single electronic IC, which is electrically connected via solder bumps to an electro-optical IC (composed primarily of the modulator 10) and a package base.

An advantage of this arrangement is that the electro-optical IC and the electronic IC can be separately fabricated, and the use of solder bumps to connect to two ICs together eliminates the need for impedance-matching and power-driver circuits in order to drive signals between the two components. However, the use of solder bumps to connect the two ICs together means that they must be fabricated using the same materials, in order to avoid undesirable thermal stress during operation.

For low bandwidth transmission systems, this limitation can be accommodated because the associated (lower) performance requirements mean that the designer has greater latitude for selecting IC materials. However, next generation optical transmission systems are expected to require high bandwidth, low noise, optical modulators and hybrids, and ND converters and DSPs operating at on the order of 100 Giga-Sample per second. In order to achieve satisfactory performance, it is expected that that the electro-optical and electronic signal processing ICs will have to be constructed using materials that are optimized for each function. For example, the electro-optical IC may be fabricated in Indium-Phosphide (InP), and the electronic IC may be fabricated in silicon using Complementary Metal-Oxide Semiconductor (CMOS) technology. However, the use of different materials raises the difficulty in that the two ICs have different, and generally incompatible thermal characteristics. This can make it challenging and expensive to package the two IC components in close proximity to each other.

On the other hand, an analog transmission line connection interposed between the (InP) electro-optical IC and the (silicon) electronic signal processing IC would require a bandwidth on the order of 50 GHz, or higher. Achieving this bandwidth requires very careful control of S21, S11, and S22 parameters of the transmission line out to the desired bandwidth (e.g. 50 GHz), which is also challenging and expensive.

Techniques enabling low-cost interconnection between electro-optical and electronic ICs in high bandwidth optical transmitter and receiver modules remain highly desirable.

SUMMARY

An aspect of the present invention provides an electro-optic module for receiving and detecting an optical channel light including a high-bandwidth data signal modulated thereon. The electro-optic module includes: a single optical hybrid for mixing the optical channel light with a corresponding continuous wave local oscillator light to generate a mixed light containing the high-bandwidth data signal, at least one photodetector; and an analog frequency decimator for generating a set of parallel analog signals, each analog signal representing a respective portion of the high-bandwidth signal.

Another aspect of the present invention provides a coherent optical receiver Includes an electro-optic module coupled to an electronic signal processing Integrated Circuit (IC) via a parallel analog transmission line bus. The electro-optic module receives and detects an optical channel light including a high-bandwidth signal modulated thereon. The electro-optic module includes: a single optical hybrid for mixing the optical channel light with a corresponding continuous wave local oscillator light to generate a mixed light containing the high-bandwidth data signal, at least one photodetector; and an analog frequency decimator for generating a set of parallel analog signals, each analog signal representing a respective portion of the high-bandwidth signal. The electronic signal processing IC includes a respective Analog-to-digital (A/D) converter for sampling each one of the set of parallel analog signals, and for generating corresponding parallel digital sample streams; and a digital signal processor (DSP) for processing the parallel digital sample streams to extract the high-bandwidth signal.

BRIEF DESCRIPTION OF THE DRAWINGS

Representative embodiments of the invention will now be described by way of example only with reference to the accompanying drawings, in which:

FIGS. 5A-5E are spectral diagrams schematically illustrating reconstruction of the high-bandwidth signal spectrum from the respective spectra of each of the parallel analog signals, in the embodiment of FIG. 4.

DETAILED DESCRIPTION

In very general terms, the present invention achieves a low-cost interconnection between an electro-optical IC and an electronic signal processing ICs by dividing the analog signal processing function between the two ICs in such a manner that a high-bandwidth analog signal can be conveyed between the two ICs in the form of multiple parallel lower-frequency analog signals. Because each of the parallel analog signals has a relatively low frequency, they can be conveyed through corresponding transmission lines that are easier (and thus less expensive) to implement than a single high-bandwidth transmission line.

Figures 1A, 1B:
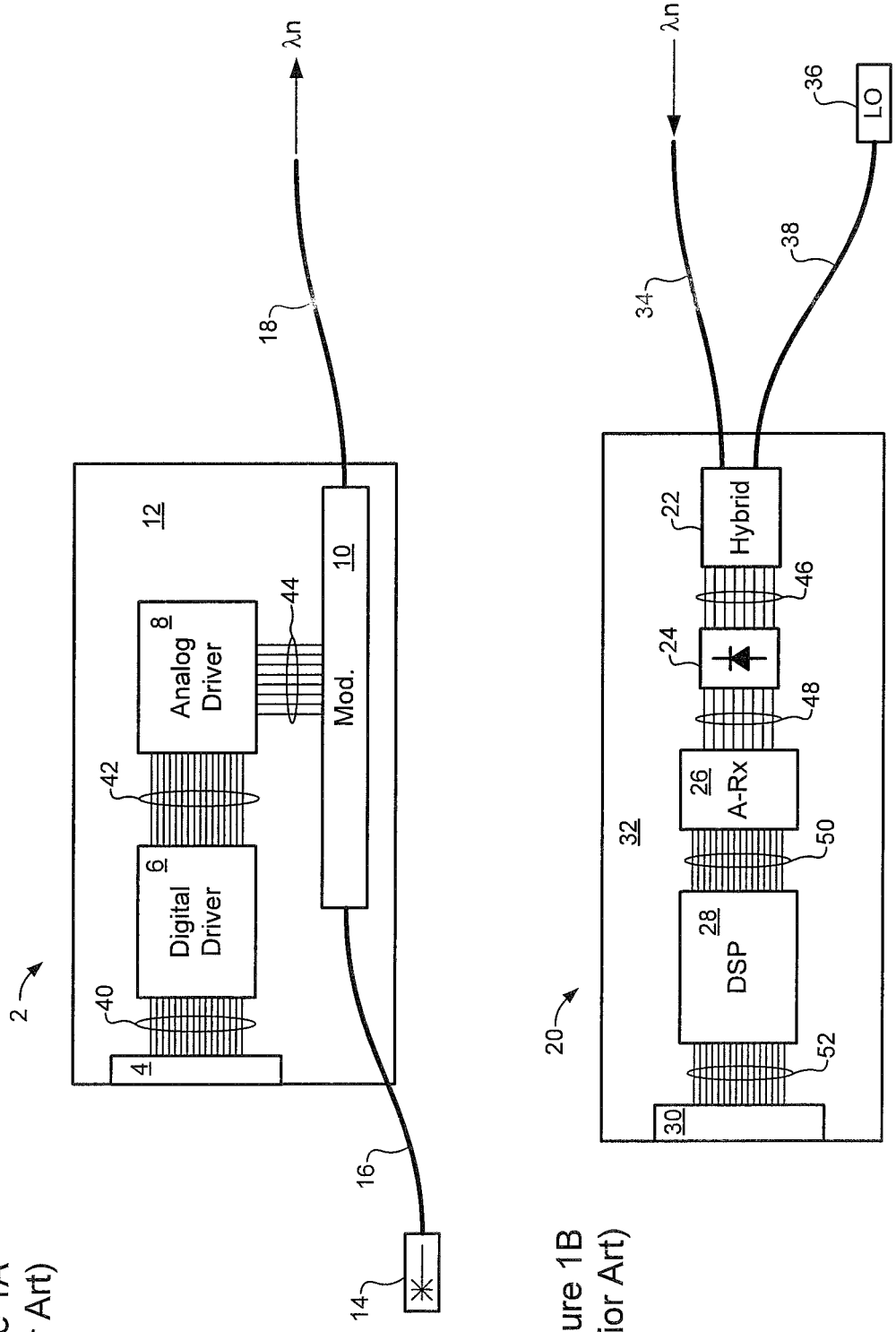
FIGS. 1A and 1B respectively illustrate principal elements of transmit and receive modules known in the art.
Figure 2A:
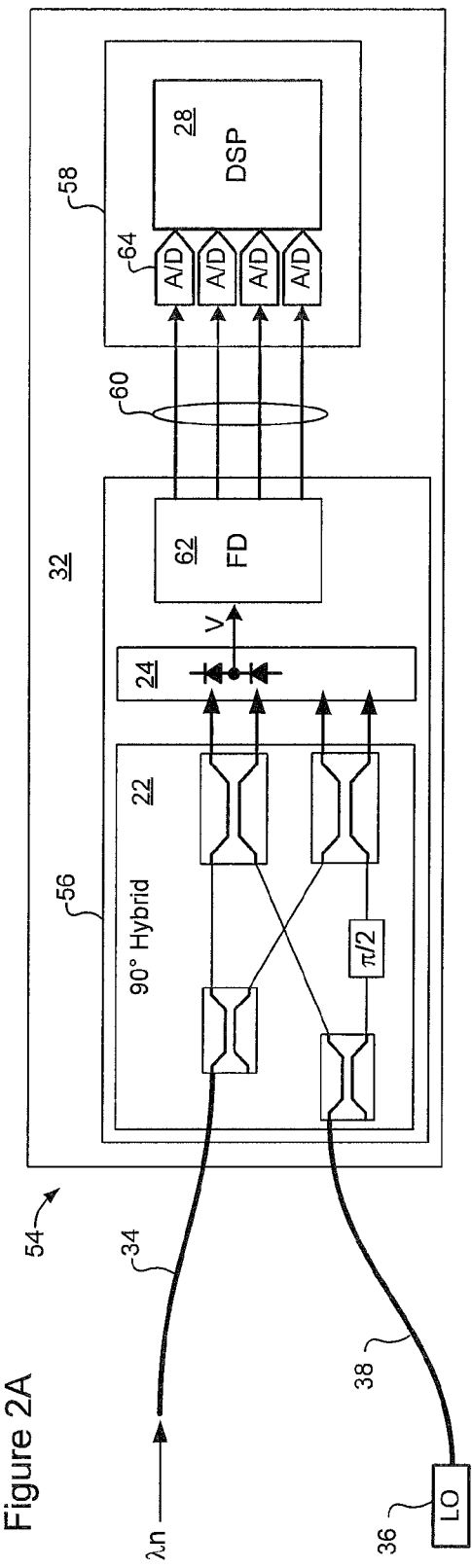
FIGS. 2A and 2B are block diagrams schematically illustrating principal elements of a receiver module in accordance with a representative embodiment of the present invention.
Figure 2B:
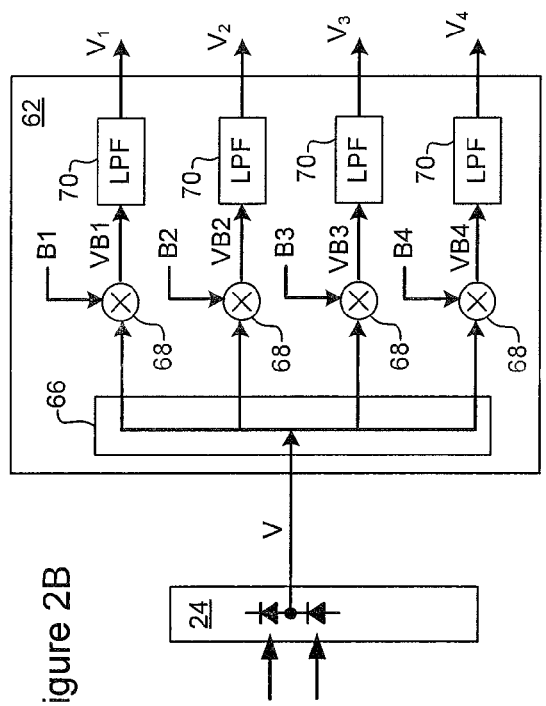

FIGS. 2A and 2B are a block diagrams schematically illustrating a high bandwidth optical receiver module 54 in accordance with a representative embodiment of the present invention. Referring to FIG. 2A, the receiver module 54 comprises an electro-optic IC 56 coupled to an electronic signal processor IC 58 via a parallel analog transmission line bus 60. The electro-optic IC 56 includes a 90° optical hybrid 22, a photodetector block 24, and an analog frequency decimation block 62. The optical hybrid 22 receives an incoming optical channel light and a local oscillator light through respective pigtails 34 and 36, and operates in a conventional manner to mix the two lights together to generate a composite lights that are made incident on the photodetector block 24. Similarly, the photodetector block 24 operates in a conventional manner to generate an analog photodetector signal V that is proportional to the power of the incident composite light. The frequency decimation block 62 processes the photodetector signal to yield a set of parallel analog signals Vx (where x is an index value, x=1 . . . N) which, when taken together, contain all of the information content modulated on the photodetector signal V; but which, taken individually, have a lower bandwidth than the photodetector current V. The electronic signal processor IC 58 comprises analog signal conditioning circuits (such as power amplifiers, filters etc., not shown) and analog-to-digital (A/D) converters 64 for converting the analog electrical signals Vx from the frequency decimation block 62 into raw digital sample streams which are processed by the DSP 28 to reconstruct the spectrum of the photodetector signal V and recover digital data signals modulated on the received optical channel signal As is known in the art, a conventional 90° optical hybrid is configured to mix the received optical channel light with the LO light and a 90° phase-shifted version of the LO light, to generate corresponding In-Phase and Quadrature composite lights. In many practical embodiments, it will be desirable to provide respective parallel signal paths (each comprising a photodetector 24 and an analog frequency decimation block 62) for receiving and processing each of these composite lights. However, for simplicity of illustration, only the In-Phase signal path is shown in FIG. 2A, it being understood that the signal path for the Quadrature composite light could be provided by suitably duplicating the elements of the In-Phase signal path.

Referring to FIG. 2B, a representative frequency decimation block 62 comprises an analog 1:N power splitter 66, which receives the photodetector current V, and outputs a set of N parallel duplicates of the photodetector current V in a known manner. In the illustrated embodiment, N=4, but this is not essential. Increasing the number N of outputs reduces the bandwidth performance requirements of the analog transmission line bus 60, at the cost of increased complexity. For enhanced performance this splitter can contain filtering and or amplification functions which, for simplicity of illustration, are not shown in the drawings. For example diplex or triplex frequency dependent splitting can be used with lower loss. Each output of the 1:N splitter 66 is connected to a respective analog signal path, each of which includes a non-linear processor 68 cascaded with a low-pass filter (LPF) 70. Each non-linear processor 68 applies a non-linear operation to the photodetector current V using a respective branch signal Bx to yield a composite signal VBx that is supplied the LPF 70. The LPF 70 operates in a conventional manner to attenuate undesired high-frequency components to yield a low bandwidth analog signal Vx, which can be transmitted through the analog transmission line bus 60 to the electronic signal processing IC 58.

The non-linear processor 68 can be designed to implement any suitable non-linear operation. For example, in the embodiment of FIGS. 2A-2B, the non-linear processor 68 is implemented as a conventional Radio Frequency (RF) mixer, which operates to combine the photodetector current V and the respective branch signal Bx in a known manner. In an embodiment in which the branch signals Bx are continuous wave sinusoidal signals, the non-linear function is the well known heterodyne or homodyne function. In embodiments in which the branch signals Bx are binary digital signals, the non-linear function approximates a switching or sampling function, depending on the duty cycle of the branch signals Bx.

Figure 3:
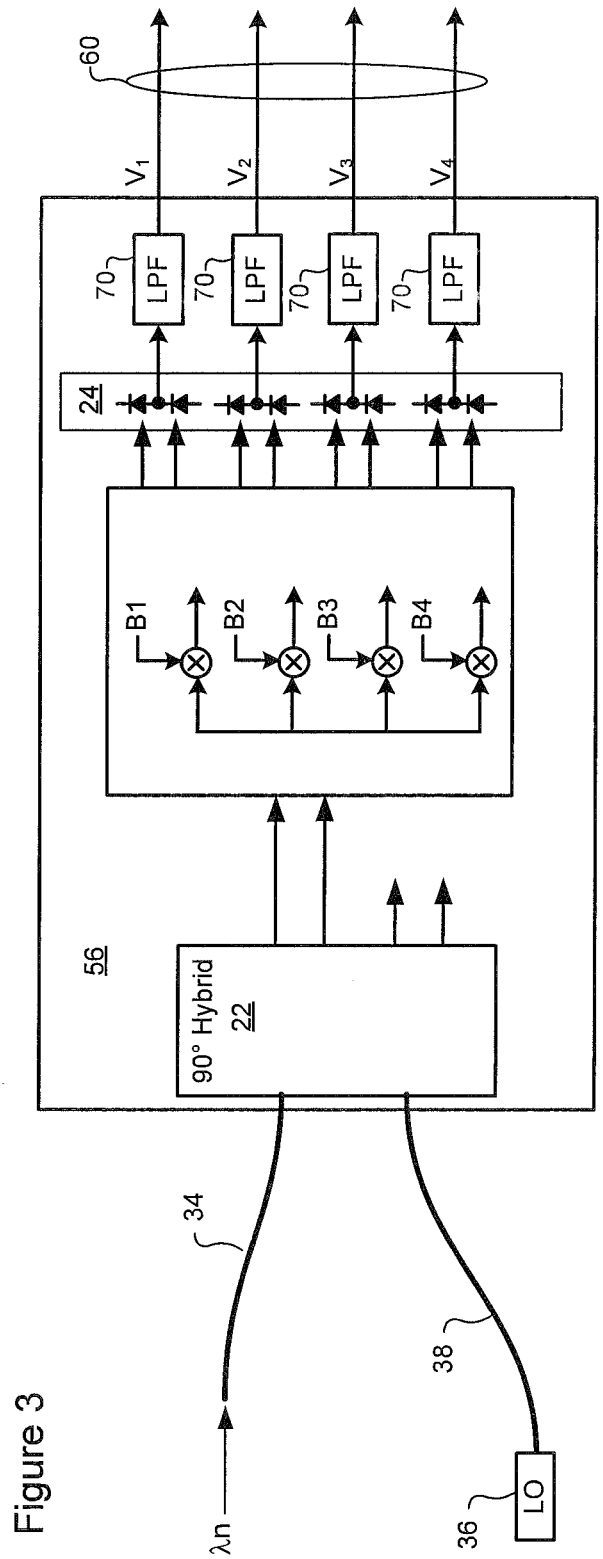
FIG. 3 is a block diagram schematically illustrating principal elements of a receiver module in accordance with a second representative embodiment of the present invention.

FIG. 3 illustrates an alternative embodiment, in which the power splitting and non-linear processing operations are performed in the optical domain, between the 90° Optical Hybrid 22 and the photodetector block 24. In this case, the non-linear processors 68 may be provided as optical signal combiners, and the branch signals Bx generated by a suitable light signal source (not shown). Techniques and devices for generating desired optical branch signals are known in the art, and thus will not be described in detail herein. Alternatively, the linear processors 68 may be provided as Variable Optical Attenuators (VOAs) controlled by suitable electrical branch signals Bx.

As may be appreciated, the branch signals Bx, non-linear processors 68, and LPFs 70 can be designed to implement any of a variety of suitable decimation schemes.

A simple embodiment can be designed to implement a frequency decimation scheme in the form of a parallel heterodyne (or homodyne) downconversion, in which each of the output analog signals Vx is a baseband (or Intermediate Frequency) signal that contains content of a respective sub-band of the photodetector current V. For example, consider a receiver module 54 in which the photodetector signal V has a bandwidth of f=70 GHz. The spectrum of the photodetector signal V contains signal components of interest lying within a frequency range extending between $-f/2$ and $+f/2$. The photodetector signal V can be divided in to N=4 low bandwidth analog signals Vx, by mixing the photodetector signal V with four sinusoidal branch (mixing) signals Bx (x=1 . . . N) comprising a baseband mixing signal B1 having a frequency of 0 Hz (DC); a pair of intermediate frequency mixing signals B2 and B3 having a frequency of $f/4$ and a relative phase, difference of 90°, and a high-frequency mixing signal B4 having a frequency of $f/2$. Each of the resulting composite signals VBx is then low-pass filtered using an LPF 70 have a bandwidth of $f/8$. Naturally, in a practical implementation, the non-linear processor 68 in path 1 can be omitted, because mixing the photodetector signal V with a baseband mixing signal B1 having a frequency of 0 Hz (DC) has no practical effect.

This arrangement is advantageous in that suitable signal sources for generating the sinusoidal mixing signals Bx (x=1 . . . N), and RF mixers are readily available at moderate frequencies, as discrete components. In addition, it is comparatively easy to reconstruct the complete spectrum of the photodetector signal V in the electronic signal processing IC. However, this arrangement suffers a limitation in that it can be difficult to design such a sinusoidal mixing arrangement at very high frequencies in one cost effective integrated component, such as a silicon IC.

An alternative embodiment is to implement a Walsh-code frequency decimation scheme known in the art. In this arrangement, a set of N branch signals Bx are generated as orthogonal bi-state signals having values of ±1 and a selected dimensionality, in accordance with the Walsh function. The non-linear processors 68 can be implemented as conventional RF combiners to mix the photodetector signal V with the respective branch signal Bx. The Low-pass filters 70 may be designed to integrate the resulting composite signals VBx, with the respective integration results being output as the low bandwidth analog signals Vx.

This arrangement is advantageous in that the LPFs 70 can be provided as conventional integrators, which can be designed to achieve satisfactory performance at low cost. For example, in some embodiments the integrators may be implemented as simple Resistor/Capacitor (RC) circuits. However, a limitation of this arrangement is that reconstruction of the complete spectrum of the photodetector signal V, in the electronic signal processing IC 58, requires inverting the Hadamard matrix formed by the set of branch signals Bx. In addition, generation of the branch signals Bx using Walsh functions, and then mixing these signals with the photodetector signal V, tends to introduce noise components that can be difficult to remove during subsequent signal processing in the electronic signal processing IC 58. Both of these issues tend to increase the cost and complexity of the electronic signal processing IC 58.

Figure 4:
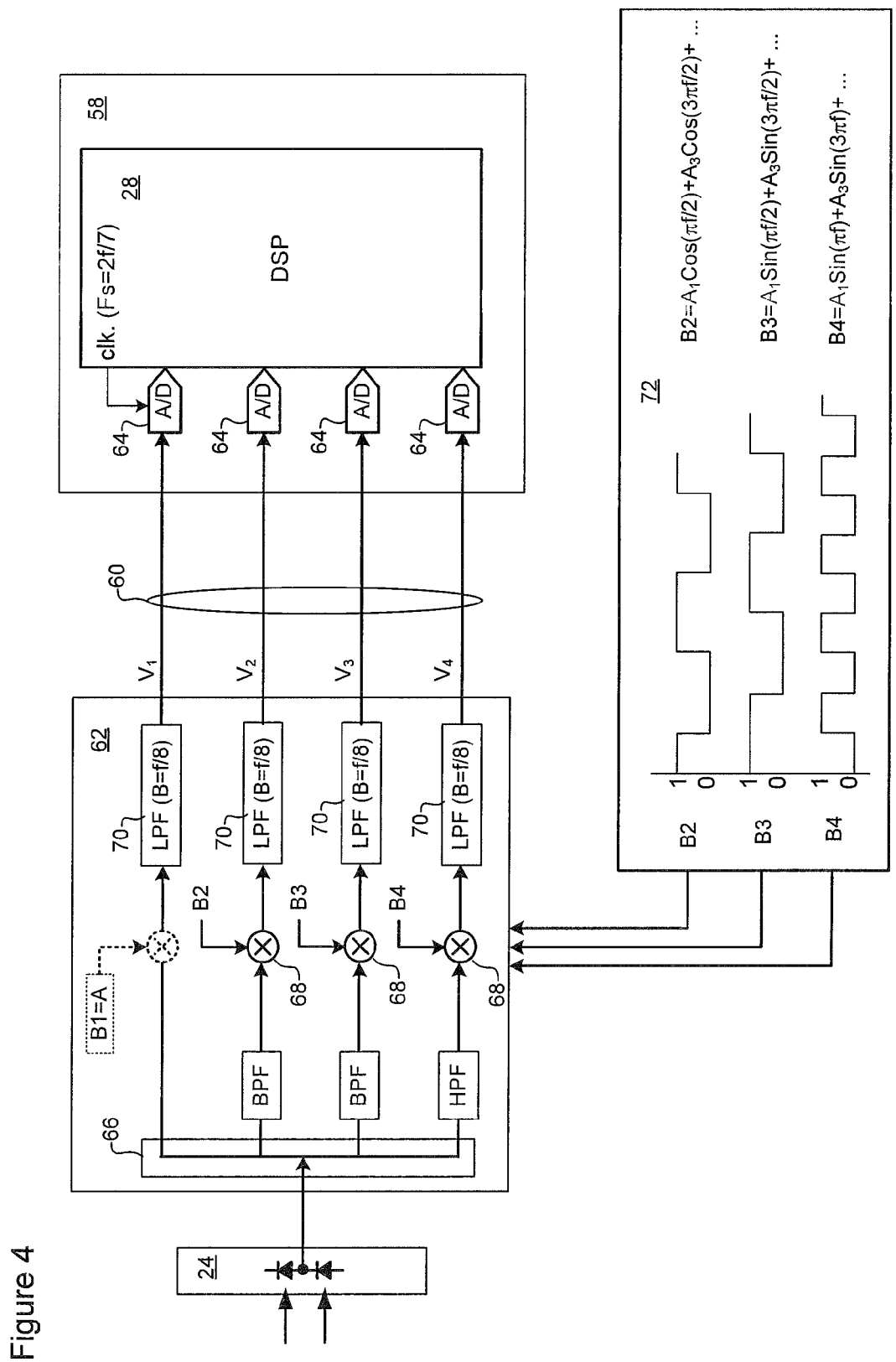
FIG. 4 is a block diagram schematically illustrating a practical mode of operation of the receiver module of FIGS. 2a and 2b.

FIGS. 4 and 5 illustrate a further alternative embodiment which implements a decimation scheme using square-wave branch signals Bx, and over-sampling. Referring to FIG. 4, the decimation block 62 includes a signal generator 72 that outputs a set of M (=N−1) branch signals Bx (x=2 ... N) in the form of digital square-wave signals having predetermined frequency and phase relationships. For the illustrated example, the spectrum of the photodetector signal V is considered to contain signal components of interest lying within a frequency range extending between −f/2 and +f/2; and the signal generator 72 outputs a pair of intermediate frequency branch signals B2 and B3 having a frequency of f/4 and a relative phase difference of 90°, and a high-frequency branch signal B4 having a frequency of f/2. The non-linear processors an implemented as conventional RF mixers which operate to mix the branch signals Bx with the photodetector signal V, and the resulting composite signals VBx filtered by conventional low pass filters having a bandwidth of f/8. As may be seen in FIG. 4, in one analog signal path, the non-linear processor 68 is omitted (in FIG. 4 this is shown in dashed lines) because the associated branch signal B1 would be a 0 Hz (DC) baseband signal. The use of digital square-wave branch signals has an advantage over pure sine-wave signals in that a digital signal generator can be readily implemented to produce signals with a satisfactory degree of phase alignment and frequency control.

As may be seen in FIG. 5B-E, the respective spectra of the four analog signals Vx output from the LPFs 70 contain signal components lying within corresponding sub-bands of the photodetector signal V spectrum (FIG. 5A). Consequently, reconstruction of the complete spectrum of the photodetector signal V can be readily accomplished in the frequency domain using methods known in the art.

In order to avoid severe aliasing errors in the recombined spectrum, each A/D converter 64 over-samples its respective input signal at a sample rate Fs=8/7×f/4=2f/7. As may be appreciated, Nyquist sampling implies a sample rate of Fs=f/4, based on an analog signal bandwidth of f/4 set by the LPFs 70. The oversampling ratio (which is 8/7 in the present example, but could be a different value, if desired), represents an increase in the sample rate over and above that needed to satisfy the Nyquist criterion. An advantage of this arrangement is that mitigation of aliasing effects can be readily accomplished in the frequency domain using, for example, the techniques described in U.S. Pat. No. 7,701,842, which issued Apr. 20, 2010.

As is known in the art, the use of square-wave branch signals instead of pure sine-waves introduces harmonics. On the other hand, since these harmonics can be readily characterized, they can be mitigated by suitable filtering, control, or matrix operations. For example, an idealized Wiener filter can be implemented in the electronic signal processing IC 58 for this purpose. If desired, such a filter may be integrated with the frequency-domain processing described in U.S. Pat. No. 7,701,842 for sample retiming, suppression of aliasing, and compensation of impairments. Control signals may be fed back to the decimating unit, for example to minimize the amount of second harmonic in a square wave mixing operation.

Figure 6A:
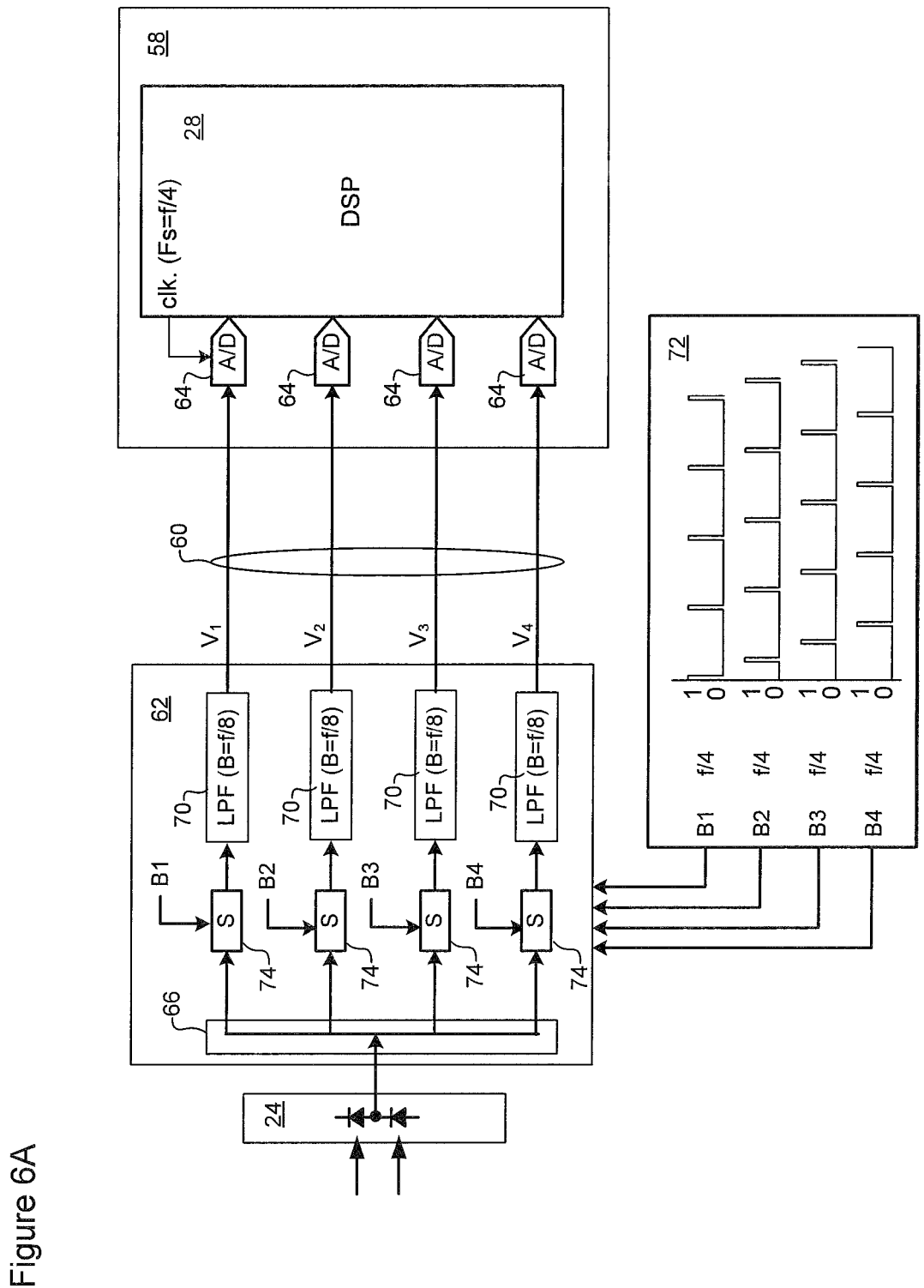
FIGS. 6A-6B are block diagrams schematically illustrating principal elements of a receiver module in accordance with a third representative embodiment of the present invention.
Figure 6B:
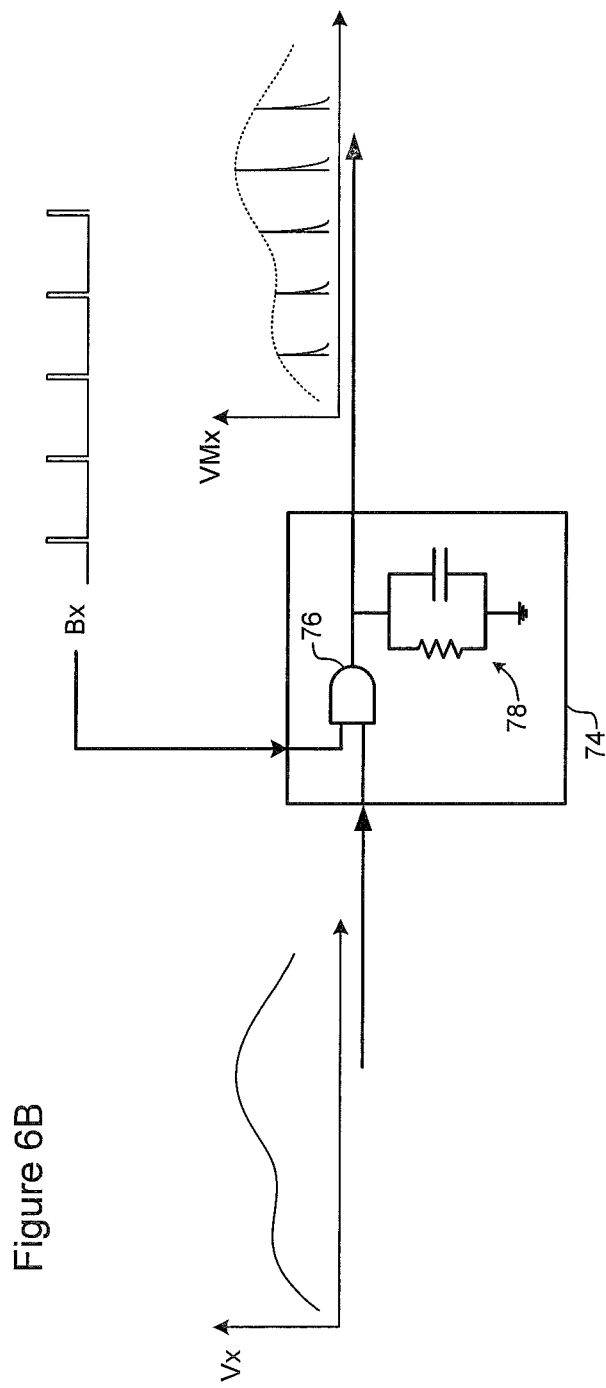

FIG. 6A-B illustrate a still further embodiment in which the non-linear processors 68 are implemented as sample and filter blocks 74 in each signal path. Referring to FIG. 6A, the frequency decimation block 62 includes a signal generator 72 that outputs a set of N sample (branch) signals Bx (x=1 ... N) in the form of short duty-cycle digital signals having a predetermined frequency of f/4 and a relative phase offset of π/2. In some embodiments, the duty cycle may be less than 1 percent. For the illustrated example, the spectrum of the photodetector signal V is considered to contain signal components of interest lying within a frequency range extending between −f/2 and +f/2. The N=4 sample signals Bx are then used to sample the photodetector signal V, and the resulting composite signals VBx filtered by conventional low pass filters 70 having a bandwidth of f/8. Each of the analog signals Vx (x=1 ... N) contains signal components of interest lying within a frequency range extending between −f/8 and +f/8.

Referring to FIG. 6B, each sample and filter block 74 may be implemented by a logical AND gate 76 cascaded with a sample filter 78. Consequently, when the sample signal Bx is high, the AND gate 76 will supply the input signal V to the sample filter 78. In some embodiments, the sample filter 78 may be designed with a raised-cosine filter characteristic. In other embodiments, an RC circuit may be used. The combination with an AND gate sampler 76 driven by a short duty-cycle branch signal Bx and a sample filter 78 with a sufficiently fast time-constant will yield a composite signal VBx in the form of a series of narrow impulses that are then passed to the low pass filter 70 (FIG. 6A).

With this arrangement, controlling the A/D converters 64 of the signal processor IC 58 to sample the analog signals Vx (x=1 ... N) at a sample rate of f/4 enables the DSP 28 to reconstruct the spectral content of the photodetector signal V, and so recover the information content modulated on the received channel signal. If desired, over-sampling of the analog signals in order to enable mitigation of aliasing effects, as described above with reference to FIGS. 4 and 5 may also be implemented in the embodiment of gigs 6a-b.

In the foregoing description, the invention has been described with reference to representative embodiments implemented in a coherent optical receiver. It will be appreciated, however, that the present invention is not limited to use in a receiver, but may be implemented in a transmitter, if desired.

Figure 7A:
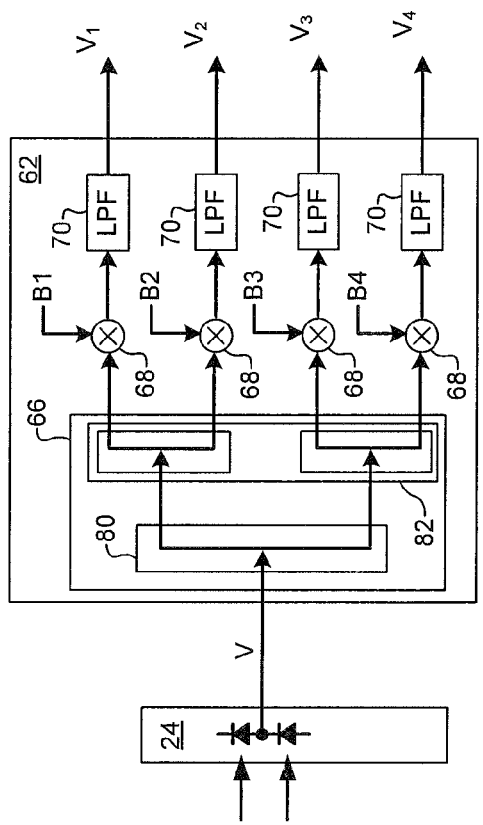
FIGS. 7A-7B are block diagrams schematically illustrating principal elements of a receiver module in accordance with further representative embodiments of the present invention It will be noted that throughout the appended drawings, like features are identified by like reference numerals.

In the embodiments described above, the 1:N splitter 66 is configured as a single stage N-way divider within the decimation block 62. Furthermore, in each of the illustrated embodiments, N=4. However, it will be appreciated that neither of these features are essential. In some embodiments, it may be desirable to configure the 1:N splitter as a multi-stage splitter 66 comprising cascaded divider stages. For example, FIG. 7A illustrates an embodiment in which a 1:4 splitter 66 is composed of a pair of cascaded 2-way divider stages 80, 82. This arrangement can be used to construct splitters having desired splitting ratios using readily available components, For example, a 2-way divider stage 80 can be cascaded with a 3-way divider stage 82 to yield a 1:6 splitter 66 which generates N=6 parallel analog signals Vx.

Figure 7B:
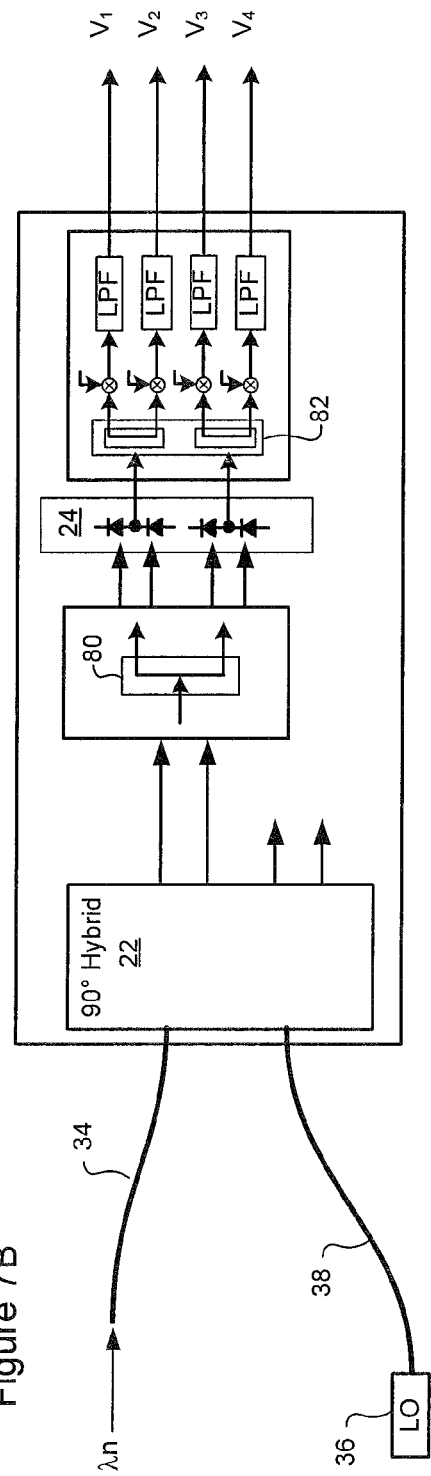

Additionally, in some embodiments, it may be advantageous to apply filtering between splitter stages. In some embodiments, it may be advantageous to implement a first divider stage 80 in the optical domain, and implement a second divider stage 82 in the electrical domain, as illustrated in FIG. 7B.

In the above noted examples, the respective frequencies of the branch signals, the bandwidth of the low pass filters 70 and the sampling rate Fs of the A/D converters 64 are a function of the number N of parallel analog signals Vx. Naturally, in embodiments in which N does not equal 4, these parameters will need to be adjusted accordingly. For example, the embodiment of FIG. 6a can be generalized for any desired value of N by providing a decimation block 62 with a suitable number of analog signal paths, and designing the signal generator 72 to output N mixing signals with a frequency of f/N, and a relative phase offset of $2\pi/N$; The LPF bandwidth $B=f/(2N)$ and the sampling rate Fs of the A/D converters 64 is also f/N.

The embodiments of the invention described herein are intended to be illustrative only. References to specific devices or equipment sold by Ciena Corporation (or others) are therefore the be considered as examples only, and shall not be considered as limiting the scope of the invention, which is therefore intended to be limited solely by the scope of the appended claims.

We claim:

1. An electro-optic module for receiving and detecting a respective one optical channel light $\lambda n$ including a high-bandwidth data signal modulated thereon, the electro-optic module including:
    an optical hybrid for mixing the optical channel light $\lambda n$ with a corresponding one continuous wave local oscillator light to generate a mixed light containing the high-bandwidth data signal;
    at least one photodetector; and
    an analog frequency decimator for generating a set of two or more parallel analog signals, each analog signal representing a respective portion of the high-bandwidth signal.

2. The electro-optic module as claimed in claim 1,
wherein the analog frequency decimator comprises:
    an analog 1:N splitter for supplying an input signal to a set of N (where N is an integer greater than 1) parallel signal paths, each signal path corresponding to a respective one of the parallel analog signals;
    a respective non-linear processor connected in each of M signal paths, where M is an integer and $0<M\leq N$, for processing the input signal using a respective branch signal to yield a corresponding composite signal; and
    a respective Low-Pass Filter (LPF) connected in each signal path, for low-pass filtering the respective composite signal to generate the corresponding one of the parallel analog signals.

3. The electro-optic module as claimed in claim 2, wherein the analog 1:N splitter comprises a single N-way divider stage.

4. The electro-optic module as claimed in claim 2, wherein the analog 1:N splitter comprises at least two divider stages.

5. The electro-optic module as claimed in claim 4, wherein a first divider stage is implemented in the optical domain; and a second divider stage is implemented in the electrical domain.

6. The electro-optic module as claimed in claim 5, wherein:
    the first divider stage is connected to receive the mixed light as the input signal;
    the at least one photodetector comprises a respective photodetector connected to receive light from each output of the first divider stage and generating a corresponding photodetector signal; and
    the second divider stage comprises a respective divider connected to receive each photodetector signal to generate the set of parallel analog signals.

7. The electro-optic module as claimed in claim 2, wherein the respective non-linear processor connected in each signal path comprises a radio Frequency (RF) signal combiner.

8. The electro-optic module as claimed in claim 2, wherein:
    the at least one photodetector is connected to receive the mixed light and generate a corresponding photodetector signal including the high-bandwidth signal; and
    the analog frequency decimator is connected to receive the photodetector signal as the input signal, and to process the photodetector signal in the electrical domain to generate the set of parallel analog signals.

9. The electro-optic module as claimed in claim 2, wherein:
    the respective non-linear processor connected in each signal path comprises either one of an optical signal combiner and a variable optical attenuator, for processing the mixed light with a respective branch signal to yield a corresponding optical composite signal; and
    the at least one photodetector comprises a respective photodetector connected in each signal path, for receiving the optical composite signal and generating a corresponding photodetector signal.

10. The electro-optic module as claimed in claim 2, further comprising a signal generator for generating the branch signals as a set of parallel digital signals having predetermined frequency and phase relationships.

11. The electro-optic module as claimed in claim 10, wherein N=4, and the high-bandwidth signal comprises signal components of interest lying within a frequency range extending between $-f/2$ and $+f/2$; and wherein:
    the set of parallel digital signals are square-wave branch signals including: a first intermediate frequency branch signal having a frequency of f/4; a second intermediate frequency branch signal having a frequency of f/4 and a phase offset of 90° relative to the first intermediate frequency branch signal, and a high-frequency branch signal having a frequency of f/2 and a phase offset of 0° relative to the first intermediate frequency branch signal; and
    each LPF has a bandwidth of f/8.

12. The electro-optic module as claimed in claim 10, wherein the high-bandwidth signal comprises signal components of interest lying within a frequency range extending between $-f/2$ and $+f/2$; and wherein:
    the set of parallel digital signals comprises N short duty-cycle digital branch signals having a frequency of f/N and a relative phase offset of $2\pi/N$ relative to each other; and
    each LPF has a bandwidth of $B=f/(2N)$.

13. The electro-optic module as claimed in claim 12, wherein the respective non-linear processor connected in each signal path comprises a signal sampler cascaded with a sample filter, the signal sampler being responsive to a respective branch signal to supply the input signal to the sample filter.

14. The electro-optic module as claimed in claim 13, wherein the signal sampler comprises a logical-AND gate.

15. The electro-optic module as claimed in claim 13, wherein the sample filter is designed to exhibit a raised cosine filter characteristic.

16. The electro-optic module as claimed in claim 13, wherein the sample filter comprises a Resistor/Capacitor (RC) circuit.

17. The electro-optic module as claimed in claim 12, wherein a duty cycle of each short duty-cycle branch signal is less than 1 percent.

18. A coherent optical receiver comprising:
 the electro-optic module as claimed in claim 2; and
 an electronic signal processing Integrated Circuit (IC) connected to the electro-optic module via a parallel analog transmission line, the electronic signal processing IC comprising:
  a respective Analog-to-digital (A/D) converter for sampling each one of the set of parallel analog signals, and for generating corresponding parallel digital sample streams; and
  a digital signal processor (DSP) for processing the parallel digital sample streams to extract the high-bandwidth data signal.

19. The coherent optical receiver as claimed in claim 18, wherein each ND converter is controlled to oversample its respective analog signal at a sample rate Fs which is greater than that required to satisfy the Nyquist criterion.

20. The coherent optical receiver as claimed in claim 19, wherein an oversampling ratio of each ND converter is 8/7.

21. The coherent optical receiver as claimed in claim 18, further comprising a signal generator for generating the branch signals as a set of parallel short duty-cycle digital signals having a frequency of f/N and a relative phase offset of 2π/N relative to each other; wherein:
 each LPF has a bandwidth of B=f/(2N); and
 each ND converter is controlled to sample its respective analog signal at a sample rate Fs of f/N.

* * * * *